US009665711B1

(12) United States Patent
Jakobsson et al.

(10) Patent No.: US 9,665,711 B1
(45) Date of Patent: May 30, 2017

(54) MANAGING AND CLASSIFYING STATES

(71) Applicant: Fatskunk, Inc., San Mateo, CA (US)

(72) Inventors: Bjorn Markus Jakobsson, Portola Valley, CA (US); Karl-Anders R. Johansson, Malmo (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/099,200

(22) Filed: Dec. 6, 2013

Related U.S. Application Data

(60) Provisional application No. 61/736,492, filed on Dec. 12, 2012.

(51) Int. Cl.
*H04L 29/00* (2006.01)
*G06F 21/55* (2013.01)

(52) U.S. Cl.
CPC ................... *G06F 21/554* (2013.01)

(58) Field of Classification Search
CPC ....................................................... H04L 12/26
USPC ............................................. 380/252; 726/23
See application file for complete search history.

(56) References Cited

U.S. PATENT DOCUMENTS

| 5,764,890 A * | 6/1998 | Glasser et al. .................. 726/11 |
| 7,304,570 B2 * | 12/2007 | Thomas et al. .......... 340/539.11 |
| 2005/0018618 A1 * | 1/2005 | Mualem et al. .............. 370/252 |
| 2010/0037321 A1 * | 2/2010 | Oz et al. ......................... 726/24 |

* cited by examiner

*Primary Examiner* — Anthony Brown
*Assistant Examiner* — Michael D Anderson
(74) *Attorney, Agent, or Firm* — Won Tae C. Kim

(57) ABSTRACT

A first identifier associated with a first routine is received as input. A determination of whether a first list includes the first identifier is made. In response to the determination, a first action is performed in the event the first list includes the first identifier. A second action that is different from the first action is performed in the event the first list does not include the first identifier.

20 Claims, 11 Drawing Sheets

MANAGING AND CLASSIFYING STATES

CROSS REFERENCE TO OTHER APPLICATIONS

This application claims priority to U.S. Provisional Patent Application No. 61/736,492 entitled MANAGING AND CLASSIFYING STATES filed Dec. 12, 2012 which is incorporated herein by reference for all purposes.

BACKGROUND OF THE INVENTION

Individuals routinely use electronic devices to conduct transactions, such as to purchase items, transfer money, or access premium content. Unfortunately, as individuals are increasingly using devices for such activities, such devices can become an attractive target for malicious entities. One approach malicious entities employ is to install or cause to be installed unauthorized programs on the device of a victim. The unauthorized programs can engage in a variety of undesirable behaviors, without the victim's knowledge, such as eavesdropping on the victim's communications, and stealing data from the device. It can be difficult to ascertain whether or not unauthorized programs are present on a device, particularly if the device is resource constrained, such as a mobile device. Further, whether a device is compromised or not can rapidly change, such that a device that is considered free of unauthorized programs at one time, can be compromised at a later time.

BRIEF DESCRIPTION OF THE DRAWINGS

Various embodiments of the invention are disclosed in the following detailed description and the accompanying drawings.

DETAILED DESCRIPTION

Figure 1:
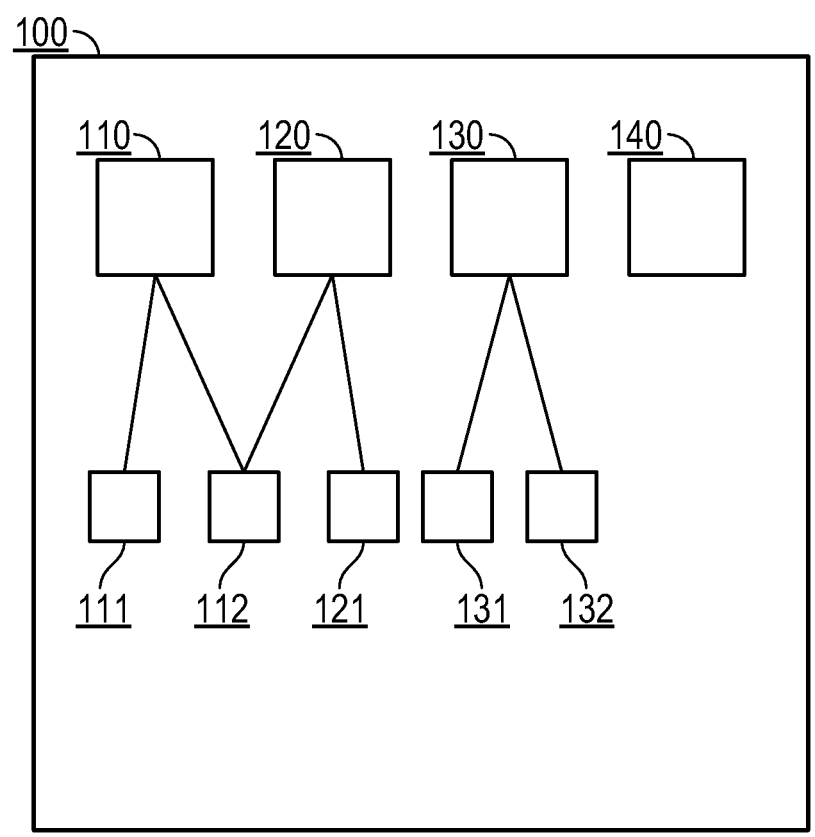
FIG. 1 illustrates an embodiment of how different behaviors with respect to one test can distinguish malware instances.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Disclosed herein are a variety of techniques for starting processes on a device in a manner that maintains security (e.g., after the device has been determined to be in a safe state). The following are examples of four techniques described herein:

One: Managing what applications, application states, data and transformations of such are necessary to a first process, and which are acceptable to the first process. The necessary items must be loaded after a scan is initiated in the context of the first process, and the acceptable items may be initiated, which means that they are initiated if they were executing prior to the scan or if they are considered necessary by any process that is being initiated.

Two: Determining the type of malware that infects a set of devices, based on similar malware actions when it is being scanned; based on how the malware appears to spread; and based on the results of the scan.

Three: Simplifying the configuration task that is necessary to scan a device.

Four: Scanning networked devices of common types, such as routers and sensor nodes.

Managing Good States

Figure 4:
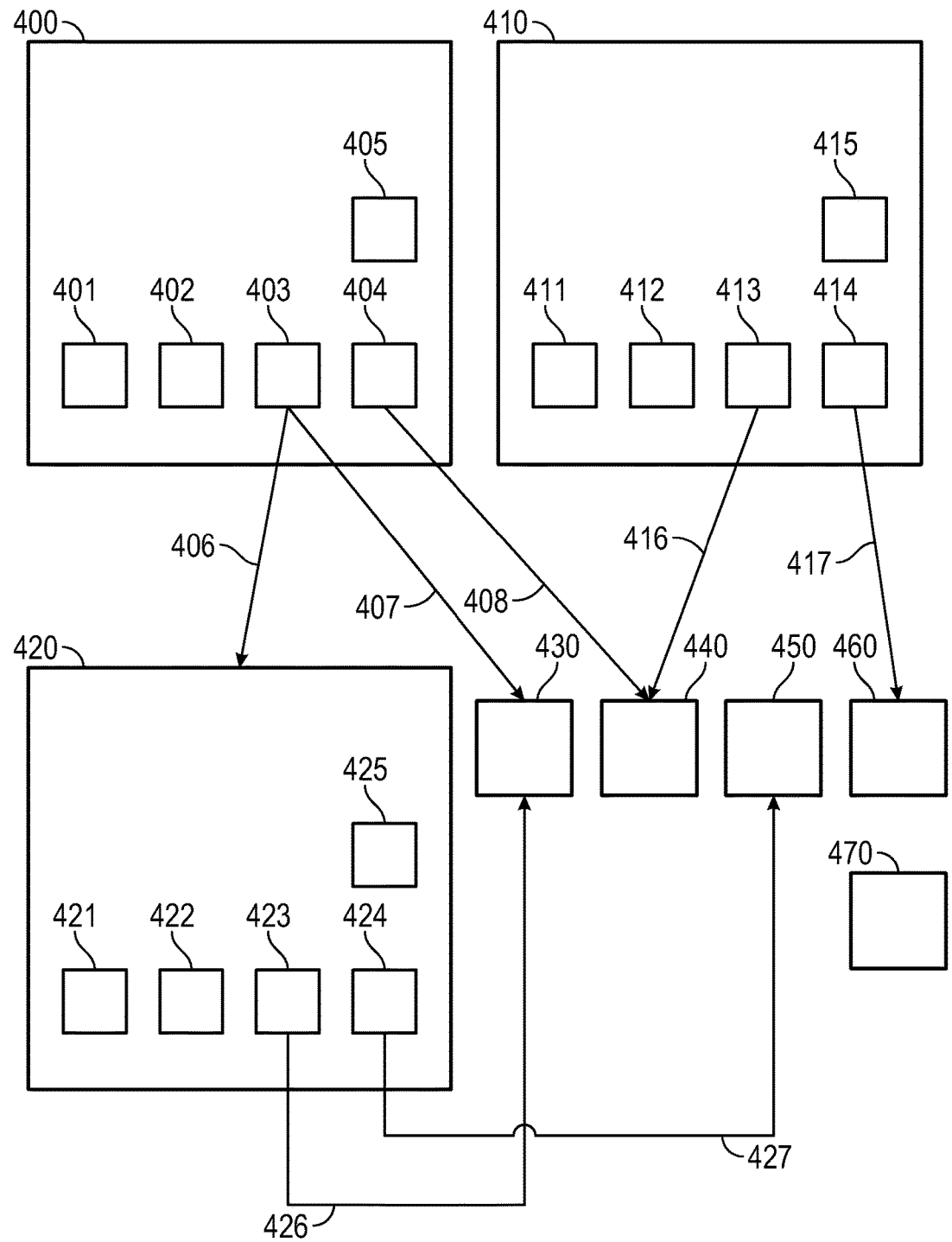
FIG. 4 illustrates two example records that are associated with desirable states.

A device is determined to be in a safe state, which means that no undesirable processes are executing. In some embodiments, the safe state includes reference to at least one first directory of processes, states, data and rules that are desirable, and at least one associated second directory of processes, states and data that are acceptable in the context of each item in the first directory. For each such item in both of these types of directories, a cryptographic validation value is maintained. As one example, this is a cryptographic hash function value of a normalized version of the corresponding data item. Processes correspond to applications, operating system elements, drivers, and other programs. States correspond to configurations of processes, such as the condition of a particular process after it has executed on some input. Data corresponds to inputs to processes. Rules relate to states and data, and describe how they can be modified or combined. FIG. 4 (discussed in more detail below) provides an example data structure.

Code associated with the safe state loads and verifies processes, states and data according to a request, and validates that each such item is secure, meaning that it has not been tampered with and that its representation corresponds to the cryptographic validation value. The code also loads and verifies processes, states and data that are acceptable in the context of the requested items, and validates that each such item is secure, meaning that it has not been tampered with and that its representation corresponds to the cryptographic validation value. Any loaded item whose representation matches its corresponding cryptographic validation value is allowed to be accessed. For processes, this means to be allowed to execute. For states, that also means to be allowed to execute in the corresponding configuration. For data, it means that processes are allowed to use said data as input.

Figure 5:
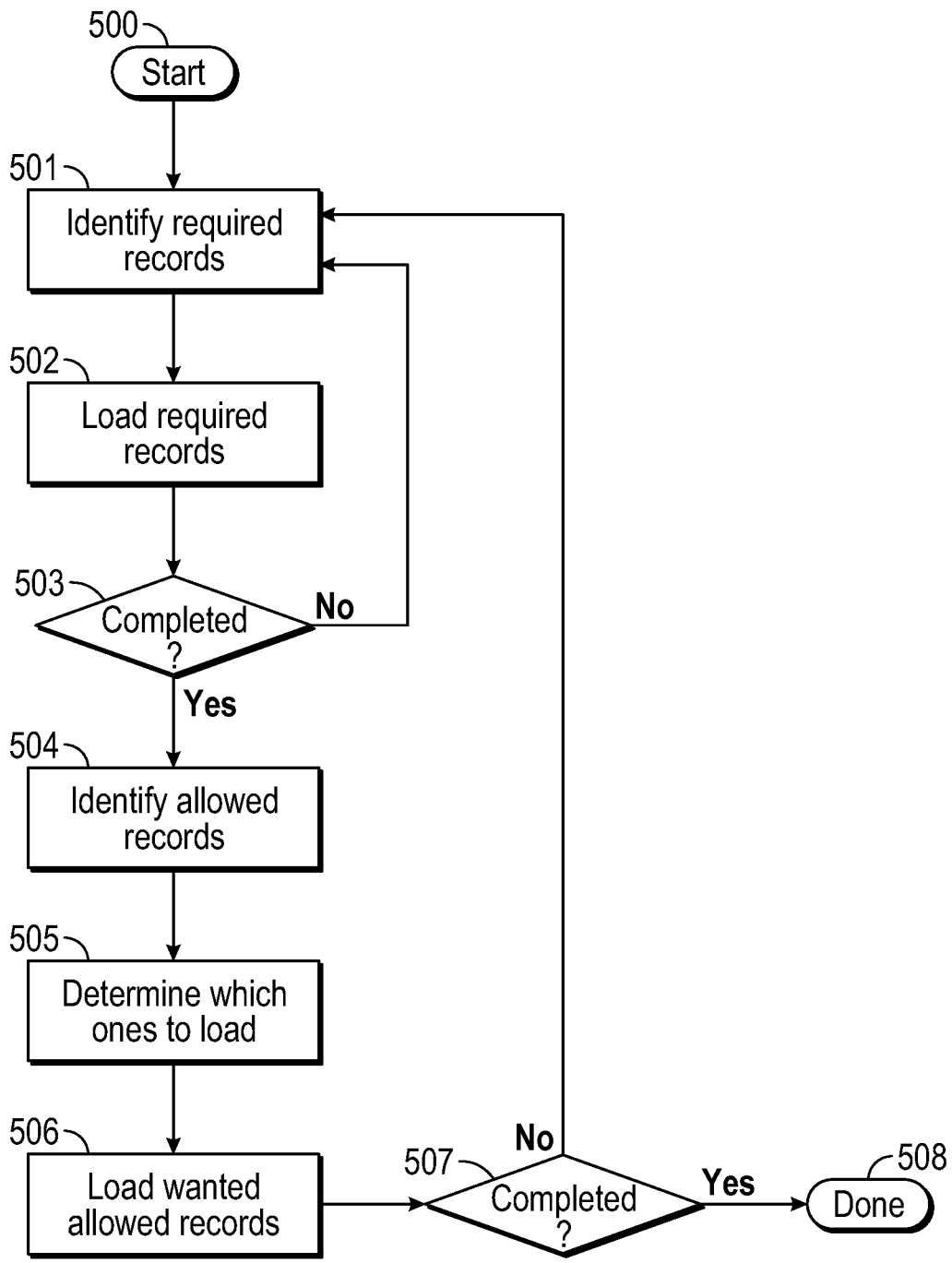
FIG. 5 illustrates an example of how processes are loaded.

If an item is found not to match the corresponding cryptographic validation value, then a collection of actions are taken. For example, first, the discrepancy is reported to an entity that identifies corrupted processes, states and data. In one embodiment, this entity is on said device, and in another, it is on a separate computational unit. Second, a determination is made what action to take regarding the item. Example actions include allowing the item to be accessed in a sandbox; not allowing the item to be accessed at all; erasing the item; making the item unavailable to other processes, including those not operating in the context on the safe state; and modifying or replacing the item to make it safe. The replacement can be made by determining the intended functionality, based in part on the computed cryptographic validation value, segments of the item, the name of the item, and the claimed properties of the item in the context of calling processes. FIG. 5 (described in more detail below) shows example steps associated with the loading of records associated with processes, states, data and rules.

In some embodiments, the safe state is entered as a result of a call to an API by a first process. The first process is associated with a second process and a state, where said second process and state are loaded as a result of the safe state being entered. Thus, depending on what process calls the API, a selection is made of a second process and associated state, and these are validated. If valid, they are made accessible, and allowed to execute. In one embodiment, the determination of what second process and state, and associated data, corresponds to said first process and its state and data is made by obtaining information of at least some of these items as part of the API call made by the first process. In a second embodiment, a table is maintained in which matching processes and state information and data is kept, and it is determined at least one of the identity of the calling process, its state, and its associated data, after which at least one associated process, state or item of data is selected and attempted to be validated. In a third embodiment, the determination is made by reviewing the context of the active processes at the time the determination of the safe state is initiated, after which a safe subset of these is selected, and the associated items validated and made accessible when appropriate.

Figure 7:
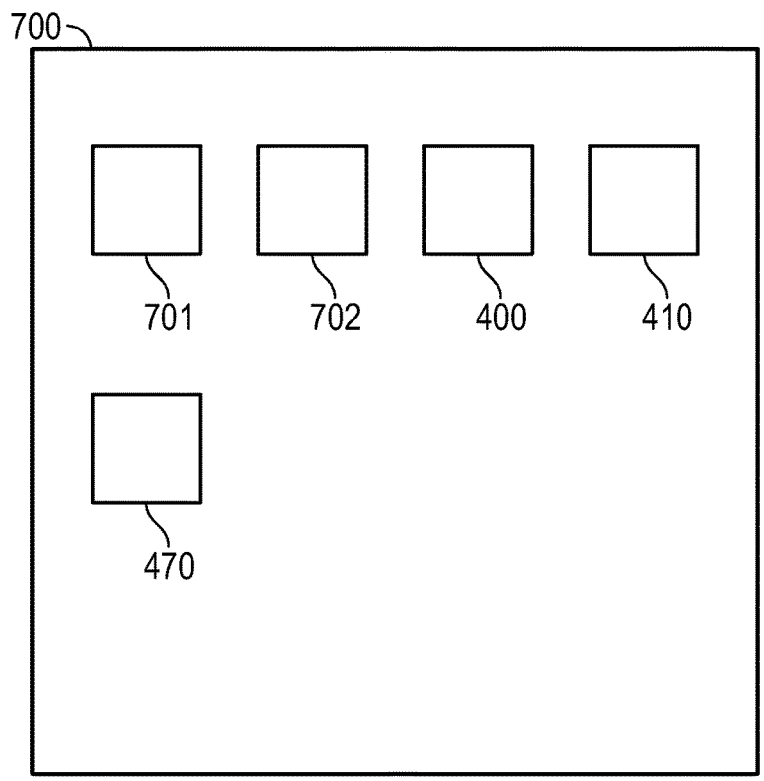
FIG. 7 illustrates an example directory that contains records associated with desirable processes, states, data, and rules.

The first directory contains processes that are desirable to execute in a safe state, such as banking software applications, processes for PIN entry, processes to back up the contents of the device, and processes to identify unwanted processes, states and data, and neutralize the associated threats. An example of this is shown in FIG. 7. The first directory also contains operating system components crucial for communication purposes, such as radio drivers; components used to set up and maintain secure communication with external entities, e.g., using SSL; data such as cryptographic keys, and personal data such as user names and passwords, which may be encrypted. The determination of which ones of these items to attempt to activate and make accessible is made by determining what process is to activated, as described above, and determine what associated items are required or desirable in the context of using the process to be activated. This is either done by consulting a table or by determining based on the contents of the process to be activated what other items are needed.

For example, a banking application process may require an SSL-build process; a radio communication process; a touch screen interface process; and a tactile feedback process, along with state information such as a preferred configuration of the process; and data such as the user name. As another example, a backup application process may require a proprietary encryption process; a communication driver process; and a process to communicate progress to the user.

Figure 8:
FIG. 8 illustrates two example directories, where the first contains required processes, and the second contains acceptable processes.

The second directory contains processes, states and data that are acceptable in the context of processes, states and data of the first directory. For example, in the context of said banking application process, the phone call process may be acceptable, whereas a particular music player process may not. At the same time, in the context of said backup process, both the phone call process and said music player process is not acceptable. FIG. 8 shows an example of a directory of required vs. acceptable processes, states, data and rules.

As one or more items from the first directory are activated and made accessible, the corresponding acceptable items from the second directory are determined. This is done in part by accessing a list associated with said first directory items; requesting from a third-party service what items are acceptable; obtaining such information from the calling process; determining from at least one item of the first directory what these acceptable items from the second directory are. If there are two or more items from the first directory that are accessible, and these have corresponding lists of acceptable items that are not identical, then a determination is made what items are acceptable by taking the intersection of the lists of acceptable items from each one of the active items of the first directory. Following the examples above, if both the banking application and the backup process are active at the same time—which requires that they are on each other's lists of acceptable items—then the phone call process would be determined to be acceptable, but the music player process would not.

An item, such as a process, can instead of having an associated list of acceptable items from the first and second directories make reference to a service that maintains information about the members of these directories. This means that the directories can be hosted externally, and either accessed by communicating to the host of these directories, or by downloading at least a part of these directories when desirable. This may be done before a safe state is initiated, as part of the process of identifying what items to make accessible during the safe state, or by an API call from a process executing inside or outside of the safe state.

In one embodiment, an item references items that are desirable and acceptable by making reference to a public key used to creating certificates for items that are deemed to belong to the associated directories. This way, as new items are developed, a trusted entity with access to the associated secret key can create certificates for these items and send at least the items, references to the items, or certificates of the items to the device where the determination is made. Furthermore, access is made to a server that maintains a list of revoked certificates and certificate keys, and any such entry is used to determine what certificates to trust when determining what items belong to the first and second directories. In some embodiments, a combination of a whitelist and certified updates including whitelist additions and subtractions is used.

To determine what states are secure, a collection of approaches can be used. In one embodiment, a trusted entity evolves the initial state to a point of value, indicating what parts are allowed to be edited, and in what manner. For example, the state of an app or webapp where a user is about to log in is a function of the actions taken to arrive at that position, some of which are general, and others which are specific to the user performing the action. A user-specific state component may be the username of the person; another relates to the password. Both of these components may be added to a state table without execution from the initial state, by replacing values in the evolved state table with data corresponding to these values, and following the rules associated with these values. Thus, a safe state corresponds to the evolved initial state, with space for the user-specific values corresponding to the portions of memory where these should be stored; and rules associated with filling these spaces, such as the length of the string that can be entered into the space, the semantics of these, such as what types of character values are allowed, their semantics to determine well-formedness, and other rules regarding relations between values. For example, if some user names are associated with PINs, others with passwords, and yet others with biometric elements, then there would be a dependency on the value of the user name and the type of data, where this dependency is determined by a rule; a lookup; or not determined a priori, in which case the execution of the algorithm corresponding to the state is determining well-formedness; or a state tables that take external input. All of these are for simplicity described as rules. Rules are associated with the first and the second directories, and relate to processes, states and data that they are associated with.

Only states that are completed in a way that complies with the rules can be activated; others are incomplete and therefore would not be acceptable.

Data for filling in the states to make them possible to be activated is stored in the first and second directories, as applicable, or input using an API, user interface or other interface, such as one that receives input from a trusted third party.

Another embodiment for deriving an acceptable state is to use a rule in the form of a state table, wherein state transitions tables take external inputs, such as inputs provided using an API, trusted third party, or user interface; and where some of the states in the state table are considered acceptable, and wherein an acceptable state is derived by accessing the state table and the input. In some embodiments, this is done in the context of the process associated with the state. The state transition table does not have to mimic the state transition table of the process, or be related in any other way than that it determines how to modify the process to obtain an acceptable state. Thus, one state table may be to accept one out of three user names to be entered into a space maintained for user names, and where the three user names are preregistered users on the device where this computation takes place; and where the user selects the user name using a user interface, or where the selection is made after the device performs a verification that the input adheres to the rules. The selection is then encoded by a selection of the proper entry in the state table; further inputs, whether from the user or from data stored in directories or obtained from a trusted third party, are used, until an indication is obtained that the selections have completed. This indication can be obtained from one of the input data sources, or be associated with a collection of entries in the state table. If the selected entry in the state table corresponds to a state that is acceptable, then the associated state is allowed to be accessed, which means that it is allowed to be executed.

In some embodiments, no rules are necessary, but the states in the directories correspond to variables and conditions of processes, and can be run without any further manipulation. Whether rules and data are applied to states or not, the accessible states can either contain the processes or be associated with the processes to which they belong, after which their associated code is executed.

The use of pre-approved processes, states, data and rules can be used in a variety of ways in the context of maintaining a safe runtime environment after such a condition has been reached once and for all. For example, it allows the execution of general routines on particular inputs, where these particular inputs are known to maintain the safe state, but whereas other types of inputs may cause failures and risks. This approach limits security exposure of machines to be protected, and is applicable both to conditions where a party has verified that the machines to be protected are in safe states, and where this has not taken place. In the latter case, the method is not known to maintain a safe runtime environment, as it has not been established that this was already in existence; however, it maintains an environment of limited exposure. The application of the rules to states and data, and the association of these with processes, permits the minimization of the attack surface associated with a given execution environment. A special case of a use scenario is where no state or data is used to augment the execution or initialization of the associated process, but where the rules are used to constrain the execution environment of the process by limiting its functionality during security sensitive periods of its execution. As such, the rules can be seen as an annotation of the executable process, limiting its functionality. This limitation can be applied to selected and discrete portions of time or for selected portions of the execution of the routine, wherein multiple such intervals can be associated with a routine. The invocation of the rule to the process, in one embodiment, is engaged by insertion of hooks in the process, whereas it is associated with the use of interrupts in another embodiment, and in yet another, the execution of the rules is run all the time that the process is run, but only constraining the functionality of the routine during the desirable sections of code. This can be achieved using middleware or by integrating the application of rules in the operating system or a similar master process.

In one embodiment, the device associated with the described processes, states, data and rules has been determined to be in a safe runtime environment. Depending on the type of determination process, this may correspond to a believed absence of known malware or undesirable executables; a known absence of such routines; the physical location of the device; or evidence of a wanted user interacting with the device. Using the techniques described herein the system maintains assurances corresponding to routines with a high level of security, corresponding in turn to a likelihood of maintaining the same or a similar run-time environment for a period of time of interest. During this period of time, selected executables can be run. The period can be ended by a user performing an action, such as aborting the safe state by starting a process that does not allow for such assurances, or indicate that a safe state is no longer of high importance. After the safe runtime environment has been left, processes can be executed without the overhead of applying the rules to states and data, and associate these with the processes.

The disclosed approach supports the use of client-specific software components, which can be used to limit exposure of legitimate routines to malware infections by making different instances of the legitimate software differ from each other. This type of client-specific versioning can interfere with traditional anti-virus approaches, and in particular routines that detect uncommon software. Using the disclosed process, state, data and rule approach, and certification or whitelisting of elements, client-specific versioning is possible to support without causing false positives to the malware detection system associated with the disclosed system. This is because unique states can be of variable length and content, and used to offset processes in one or more locations. This permits an individualization of pertinent routines while in a safe state, after which these routines can continue to execute, whether in safe or unsafe environments. Any attempt to infect such routines after an unsafe state is entered is severely complicated by the individualization. Using the disclosed technology, the software itself cannot be modified or infected while in the safe state, as all its components, state, data and associated rules are verified; after the routine starts to execute, it is therefore hardened against infection and abuse. At the same time, this approach does not cause false positives, as all the initial execution state is verified.

In one embodiment, the data is any data received from a pre-selected data source, such as a biometric reader, as long as it is of a pre-determined general format associated with the pre-selected source; such formats may include length limitations, distribution limitations, and other semantic rules relating to the data. The state can also correspond to a selection of a user profile, where this selection is made after performing a match of the input data to one or more templates or rules. This enables an automated login for users performing a biometric scan, where a suitable process is instantiated with a relevant state and relevant data, derived from the data obtained from a biometric scanner such as a fingerprint scanner integrated in a mobile device. In one embodiment, this is performed in association with a determination that the device is in a safe state, and in some embodiments caused by the activation of the biometric sensor. In another embodiment, this is performed in a state that does not have to be a safe state, but done in order to constrain the inputs to a piece of potentially software, such as a banking process. In this context, the state and data may contain a user name and a password, where these are selected upon proper matching of the biometric input to a template, thereby resulting in a login process being executed with a backend, and where this backend does is not compatible with biometric logins, but where the translation from the biometric data to a traditional credential such as a password is done by the disclosed process.

Figure 9:
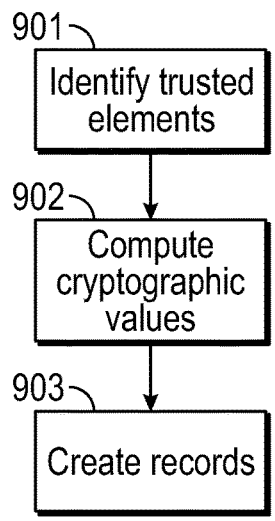
FIG. 9 illustrates an example of how records are created.

In one embodiment, some approved processes can use any state; any data; and any rules; or a combination of these, while necessitating certification or whitelisting for some of those other types of elements. For example, the libc process may in some instances be considered trusted, allowing it to use any previously saved state associated with the process, and any data applicable to the process. In some embodiments, states determined to have been previously associated with a process that is considered safe are recorded using a whitelisting technique that saves message digests of such processes in a safe manner, such as externally, in incorruptible memory, or as part of a process that is validated; by digital signature based certification processes where the signing key is associated with the process, an external trusted entity; or a trusted process on the device; or by run-time inspection of the state to determine that it has the right format; or a combination of these. An example of this is shown in FIG. 9. Similarly, data is determined to be applicable to a process if it has the proper length and format, or is certified or whitelisted; and rules are determined to be desirable if they manipulate states and data that pass the verification stage of being trusted in one of the ways described above, and the rules apply the states and data in a way consisted with how the process works.

In some embodiments, entering the clean state does not mean terminating all processes and bringing them back, but rather terminating certain processes and keeping others alive. The states, data and rules are ignored in this embodiment and only the processes (code) are inspected with the intent of terminating them or not. As described above, processes are identified using message digests of the text segment (code) of the processes. Based on policies, processes can be allowed to live (if they are on a white-list), terminated (if they are on a black-list), and/or allowed to live or be terminated (if they are on a grey-list) depending on the context of the scan and the policies of the initiating routine or associated organization. In the latter case, the grey-list may be considered either black or white depending on a signature or certificate provided by the process or entity initiating the scan.

For example, consider the grey-list containing all applications available on an official marketplace. A military or government application may want to run at the very best level of security and therefore want to terminate everything but the operating system, and by using a certificate that allows it to classify grey-list as black-list it can achieve that level of security. Another application may not opt for the same level of security and allow official marketplace applications, therefore using a certificate that classes grey-list as white-list.

In some embodiments, primarily concerning embodiments where grey-listed (and non-listed) applications can be terminated, a certificate must be used to terminate processes. The identity of the process or entity initiating the scan can be verified to ascertain its right to terminate processes by comparing the message digest of its code with one associated with the certificate.

In an embodiment where multiple processors or cores are used to perform a task, and it is important to ascertain that all processors or cores are synchronized and start at the same time, a process can be used where a variable X is set to zero, and each processor or core increases X by one and then start a loop that is only left when X equals the number or required processors or cores.

Figure 10:
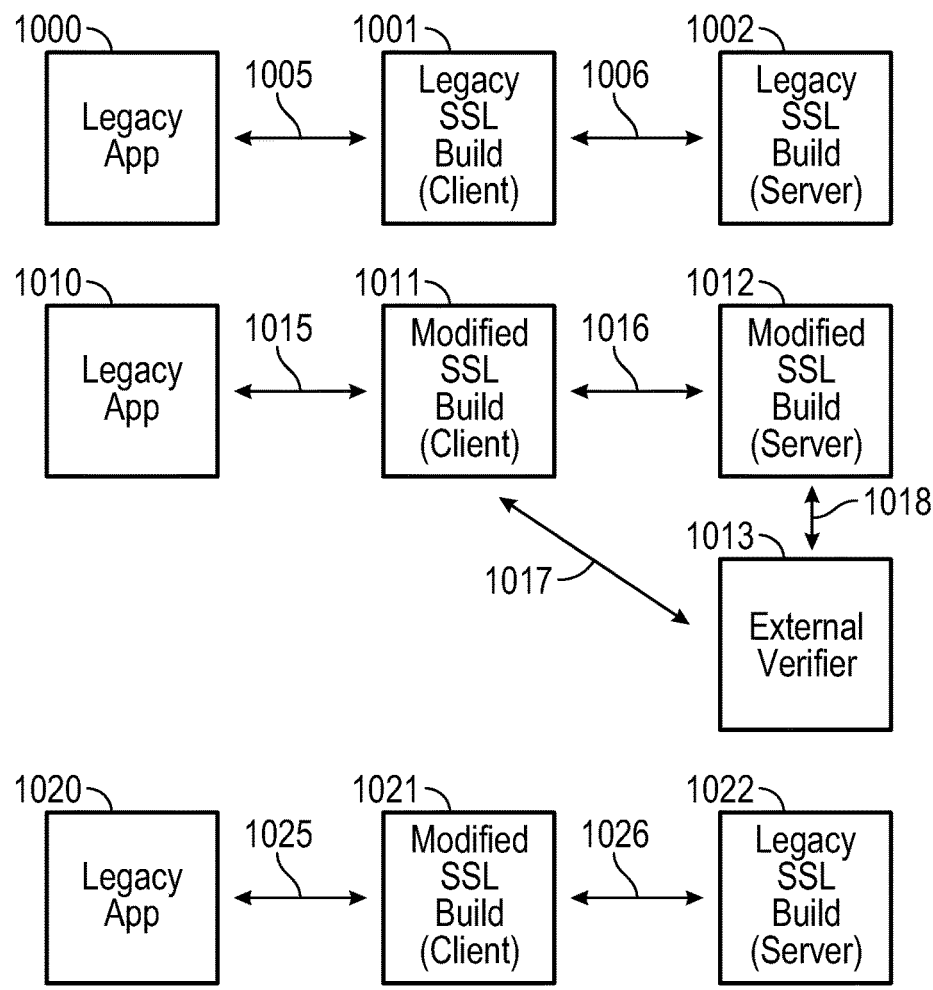
FIG. 10 illustrates an example of how a modified SSL client can be used to add scan functionality to a device.
Figure 11:
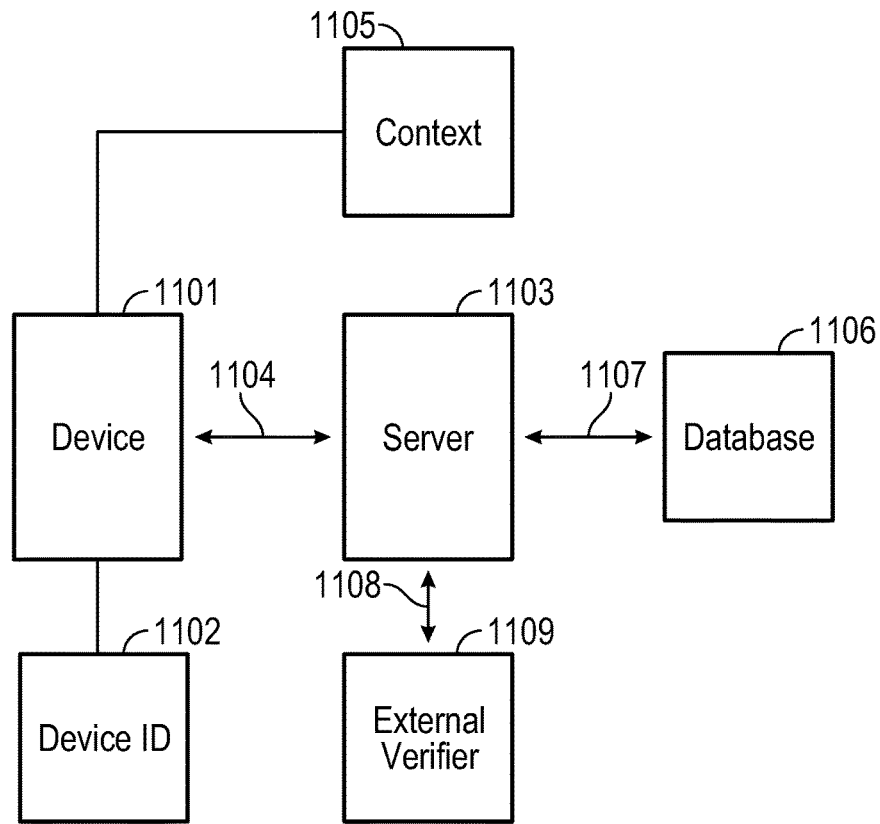
FIG. 11 illustrates an example device with an associated device identifier.

In one embodiment, the triggering of the scan is not performed directly by an app, but done indirectly, e.g., by linking the start of the scan to a side effect of a scan. For example, the initiation of a scan can be done as part of or as a result of SSL build. An example of this is shown in FIG. 10. Any app or web-app scanning the API to perform an SSL build would start a modified SSL build process, which replaces the standard SSL process on the client device. This modified SSL build process starts a scan that determines the security state. Alternatively, this modified SSL build process communicates with an external server, which may be the SSL server with which an SSL key is to be established, and this SSL server determines whether a scan is to be initiated or not, and communicates this to the modified SSL client. In some embodiments, this is done in a way that respects legacy implementations of the opposing entity, which can be achieved for example by encoding the request to perform a scan in some of the bits of the key material or the associated control data. If the SSL server determines that it wishes a scan to be performed, but none is performed, then it knows that the client device is infected or corrupted. The SSL server associates with each account, user or device a status, determining whether to demand a scan for each connection, for some connections according to an associated policy, or for no connections associated with said account, user or device. The policy states the context when a scan is required, e.g., for what types of transactions, from what types of IP addresses, or based on what types of risk assessments, and based on past scan decisions and scan results. An example is shown in FIG. 11. The SSL server determines whether a scan is desired for a particular session and communicates this information to the modified SSL client. If a scan is desired then the modified SSL client and a server associated with the SSL server, and notified of the need for a scan, are performing a scan of the device, and the results are communicated to a consuming party, which may be the SSL server. The consuming party performs an action based on the results, where example actions include terminating sessions with unsatisfactory scans; continuing sessions with satisfactory scans; performing a remedial action for or reporting or counting sessions with unsatisfactory scans; and updating user, device or account based tables based on the result. If a server expects a scan to be performed by none is performed, or none is performed before a time-out occurs, then this is recorded in a similar way, where the absence of an action is interpreted as a special case of an unsatisfactory scan.

There are multiple ways in which a device can be determined to be in a safe state. One example way in which this can be determined is by use of an interactive verification protocol run between the device and a verifier, with the potential help of a proxy that performs assessments relating to the device. Such assessments can include the time it takes to run the verification protocol; the execution state of the device; the power management state of the device; and other contextual information associated with the device. An example is provided in FIG. 12.

In an embodiment where the safe state is determined by a technique that relies on measuring execution time of an algorithm running on an application CPU as well as checking that the result of the algorithm run is correct, the timing and result checking can be performed by an external entity using over-the-air communication (such as a cellular base station); an external entity such as an ASIC, PLD or microcontroller connected to the application CPU, either within the device or connected using a wired connection; a tightly coupled entity within the application CPU package, such as a co-processor or other dedicated silicon accessible from the application CPU. Said entity may also contain code, microcode or hardware to append the timing information to the result of the algorithm run. Said entity can also contain a module for generating a Message Authentication Code of parts of or the entire message.

Another example in which a device can be determined to be in a safe state involves relying on trusted hardware, such as Intel TXT or ARM TrustZone. Taking TrustZone as an example, there are two separate ways in which the safe state can be determined. The first way is by executing certified routines in a safe environment; such certified routines are referred to as Trustlets. A Trustlet may be a routine that takes as input one or more directories, as described above, where a directory contains at least one of a number of processes; a number of states; a number of data items; and a number of rules. The routine then determines that the contents of the directory or directories are allowed to be accessed, as described above. A second way of practicing the disclosed technology in the context of trusted hardware, such as ARM TrustZone, is to let the routines associated with the secure state, such as the associated kernel or micro-instruction set, perform the task of determining what elements in input directories are allowed to be accessed, where this verification is applied to at least one process and at least one of a state, a data item, and a rule. A third way uses a heuristic technique, such as a traditional walled garden tool; a traditional signature-based or behavioral virus scanner; or a traditional method observing the communication going to or from the target device; or a combination of these. As soon as a process or a state has been verified to be allowed to be accessed, this process or state can act as above-described routine that in turn can determine for one or more directories, as described above, what elements are allowed to be accessed according to principles embodied in said process or state acting as the above-mentioned routine. Such a principle is to verify elements based on whitelists associated with said process, or certificates associated with keys associated with said process, or trusted parties associated with said process. The one or more directories may be different from this second determination of what elements are allowed to be accessed from the directories used in a first determination in which said process was determined to be allowed to be accessed, as may the whitelists, keys and trusted parties associated with these two levels of determination. Processes and states determines to be allowed to be accessed in this round may in turn identify yet other elements that are to be allowed to be accessed. As any element is determined that it is allowed to be accessed, it may be called by another routine or initiated by default according to its type.

In an embodiment where over-the-air communication is used to determine secure state, the external entity may contain functionality to compensate for a faulty or compromised over-the-air communications channel. This can include issuing a new challenge for the memory-printing algorithm if a communications error was detected instead of resending the failed-to-deliver packet with the challenge, thus preventing the possibly compromised device from pretending to not have received the challenge to buy more time to forge an OK result.

In some embodiments, there is a dependency on the integrity of code executing on a subsystem of the device. To ensure integrity of the code running on a subsystem, the system can take one of the following security measures to avoid tampering with code: The subsystem is only executing code from ROM; the subsystem is executing from its own RAM that is loaded from a trusted source, and is not accessible to other subsystems; the subsystem is executing from general RAM, but loaded from a trusted source and other subsystems cannot change it afterwards; the subsystem is executing from general RAM which gets loaded from another subsystem in a trusted state, but write-access is blocked after the loading is completed. In the latter case, the write-access (or optionally also read-access) is restricted by: the subsystem responsible for loading the code writes a register to seal off access, the register being "write-once" so the seal cannot be lifted; the system seals off access once all memory cells in the subsystem RAM area have been written to; the system seals off access once instruction pointer in the loading subsystem moves outside a predetermined region; the system seals off access once a predetermined time (number of clock cycles) have passed.

In one embodiment, a scan is triggered as a consequence of an action being taken by a process, including an app, and the scan results in the determination of whether the device is in a safe state; and if it is, in the activation of one or more processes, with their associated states and data, where rules describe how the elements are allowed to be used. Three examples of triggers are described next:

1. The SSL build routine is modified to include a call to the scan routine.

2. A flag identifying whether a memory area is protected is added to all memory contents, and as any routine attempts to access memory, then middleware or a modified version of the operating system reads the associated flag and initiates the scan if the flag is set. In one example, the flag is set to identify that the corresponding memory area is encrypted, where the decryption key is held by the external verifier or the proxy, and only released to the middleware or operating system if the scan succeeds. The use of such flags, in one embodiment, would only be read as a data segment is loaded from the secondary storage to the RAM, or from RAM to cache. This limits the number of times the scan has to be performed. After a scan has been performed, the device is considered to be in a safe state until processes that are not elements in one of the two directories are run. During this period, further accesses to the same memory area would not trigger further scans, as the data would be kept in cleartext for this period. The cleartext would be erased before the secure zone is left.

3. As any process is requesting GPS coordinates, this request is trapped by middleware or a modified portion of the operating system, which determines whether the device is in "private mode". If it is not in private mode, the GPS data request is accepted. If it is in private mode, then the middleware or the modified portion of the operating systed determines whether to serve GPS data, based in part on whether the current GPS location is within one or more secret perimeters; what process requested the GPS data; and what the results are of a scan to determine whether the device is in a safe state. The latter is determined by at least one of initiating a scan; determining what processes have operated since the last scan; what data and states these have processed since the last scan; and on indications of whether any event that is not on a list of secure events has taken place. The GPS location reported to the process requesting GPS coordinates will, based on these determinations, be one of the real GPS coordinates; fuzzed GPS coordinates; fictional GPS coordinates; and no GPS coordinates at all. Here, GPS coordinates are said to be fuzzed if the least significant bits of the data are removed or replaced with a number that is random, computed using an algorithm, but not reflecting the actual least significant bits of the location; or replaced with a value that is used to communicate status to the process requesting GPS coordinates, where the status is not the same as the least significant bits of the observed GPS coordinates. GPS coordinates are said to be fictional if they do not correspond to real coordinates, but replaced with coordinates along a sequence of positions replacing the real coordinates in order to cause an incorrect understanding of location.

Another aspect of the disclosure is a set of actions taken by the back-end server upon unsuccessful scanning of a device. For example, the back-end server will determine that credentials associated with the account that is associated with the infected device are no longer acceptable, or require a step-up authentication in conjunction in order to log in to the account. An infected device can steal such credentials.

Another aspect of the disclosure is a set of actions taken to register a new device in a secure manner, and in a way that does not allow a person who has stolen information from an end user, using social engineering and malware among other things, to register a new device in the name of a victim user. In a setting where the distribution channel is carefully controlled, such as in a military setting, this is achieved by physical identification of the user who requests a new device, followed by a network-based deactivation of the old device. In a setting where the verification of the physical identity by the distribution channel is unreliable, the registration of a replacement device preferably requires information to be input, where this information is not readily available to a typical user in a typical setting; and therefore not easily stolen using traditional fraud methods. An example authentication method relies on sending a secret credential to the user using physical delivery channels and requiring use of this credential to instantiate the new device with backed-up information associated with the old device, such as sending a letter to the user where the letter contains a bar code or a number entered by photographing the bar code or entering the number by hand on the device, or on an unrelated device with network access; where this secret credential is communicated to the backend, which enables the use of the newly acquired device, and ties it to the specified backup account.

Classifying Bad States

One traditional anti-virus technology identifies malware by its code appearance (signature) or computation patterns (behavioral). If anti-virus companies have not yet developed a signature or behavioral profile describing a given malware strain, then it remains undetected by traditional anti-virus technology. An alternative approach to detecting malware is to pause or disable all computation, and then perform a detection computation that results in a time for the computation and a value result of the computation, both of which are assessed by a verifier. This detects all active malware, but it does not classify malware based on its behavior. Described herein are techniques to identify and classify malware based on its interaction with the verifier, along with environmental factors observable by the verifier. Here, we refer to any unwanted code interfering with the execution as active malware.

As a verifier starts interaction with a device and issues a computational challenge, a collection of different outcomes are possible.

1. One case is for the device not to have any malware, resulting in satisfactory timing measures and satisfactory value results being obtained by the verifier as a result of the issuing of the computational challenge.

2. Another case is for the device to have malware that does not interfere with the operating system and related routines, and which therefore is successfully disabled as a result of the issuance of the computational challenge. Typical Trojans behave in this manner. A subsequent scan of the contents of secondary storage allows a third-party server to record or detect such malware, which is not active. This malware can be identified using traditional signature-based anti-virus methods, whether while still residing on the device or after having been copied at least in part to a third-party server where traditional-type signature-based techniques can be used to identify it, and where traditional behavioral techniques can be used to identify it as it is being executed in a sandbox.

3. If the device is infected, the malware may prevent the verifier from interacting with the device. While this may also be the result of network unavailability, battery failure or other hardware problems, the verifier will attempt to issue new computational challenges to the device, not granting it access to an associated resource until the challenge is responded to in a satisfactory manner. The external verifier makes note of the failure to complete the computation associated with the challenge.

4. If the device is infected, the malware may prevent the verifier from disabling at least one malware routine, which will remain active and which will cause an incorrect timing value. Incorrect timing values may also be the result of latency variance in systems where this is present; if there is a suspicion that this may be the situation, then the verifier may issue another computational challenge and determine whether this also results in an incorrect timing value. According to a policy used by the verifier, the device may be prevented from gaining access to a resource associated with the challenge. If the timing is not satisfactory, then external verifier makes note of this.

5. If the device is infected, the malware may result in an unsatisfactory value result being obtained by the verifier. This may also be the result of communication errors and hardware failure. The verifier may issue another computational challenge and determine whether this also results in an incorrect value result. According to a policy used by the verifier, the device may be prevented from gaining access to a resource associated with the challenge. If the value result is not satisfactory, then the external verifier makes note of this, along with a value that is a function of the value result, and which may be thought of as a checksum of at least one or more malware routines that remained active throughout at least a part of the computation associated with the challenge.

The above computation can be described by a tuple (completion, timing success, value success, checksum, time, success). Here, completion is a variable that indicates whether the interaction completed; timing success is a variable that indicates whether the timing is satisfactory; value success is a variable that indicates whether the value result is satisfactory; and checksum is a value that is a function of the value result and the challenge; time represents the time it took; and where success is a variable that indicates whether the timing and the value result both are satisfactory. It is sufficient to observe the value of the variable success to determine whether a device can be asserted to have no malware or not. The other variables are indicative of the type of malware.

A first type of malware may stop the protocol described above from completing. This will result in a (completion, timing success, value success, checksum, time, success)= (false, *, *, *, *, false), where * indicates that the value does not matter or does not apply. A second type of malware, may remain in memory and attempt to compute the expected value result, but fail to do so within the time boundaries. This may correspond to (completion, timing success, value success, checksum, time, success)=(true, false, true,*, time, false). A third example type of malware, such as "com- .space.sexypic-GGTRACK", may refuse to be inactivated, which may result in (completion, timing success, value success, checksum, time, success)=(true, *, false, checksum, *, false). If the malware scan of a given device results in (completion, timing success, value success, checksum, time, success)=(true, false, true, *, 3.4 s, false), the verifier would know that it is not a malware of the first example type, nor malware of the third example type. It may not know what particular strain of malware it is, but it would know that it is malware of the second type, and that the malware caused a delay of 3.4 seconds. Different malware strains are likely to cause different such delays, and therefore, the verifier can narrow down what likely strain(s) it is observing. Similarly, in the case where the value result is incorrect, the value of checksum will identify the malware strain with a good probability, and will help exclude malware strains that result in other checksum values.

In addition to observing and recording tuples of the type described above, or of related nature, the verifier can also collect environmental data about the device. As one example, the verifier will record:

a. The time(s) of the failed scan(s).

b. The location of the device, as expressed by routing information, cell-tower information, or other location information.

c. Data associated with the device and its user(s), such as the social network(s) associated with the user(s) of the device.

d. Recent activity associated with the device, such as information about communication to and from the device, including the sender(s), recipient(s), data contents, and other information, such as whether the contents were encrypted, whether it was email, SMS, voice; whether it had attachments; routing information; etc.

Based on the classification of the device, given the tuple (completion, timing success, value success, checksum, time, success), and based on patterns observed in terms of environmental data; and based on such information associated with other devices; the verifier will be able to further narrow down what the malware does. For example, if a given strain of malware spreads using Bluetooth, then this will result in geographically co-located observations of infected devices within a given period of time. Another may spread using the contacts of the user of the infected device, which will result in limited degrees of co-location for the detections of infected devices within a given period of time. Yet another, such as an Internet worm, may spread by selecting an IP address to jump to, and attempt to infect such a device.

Figure 13:
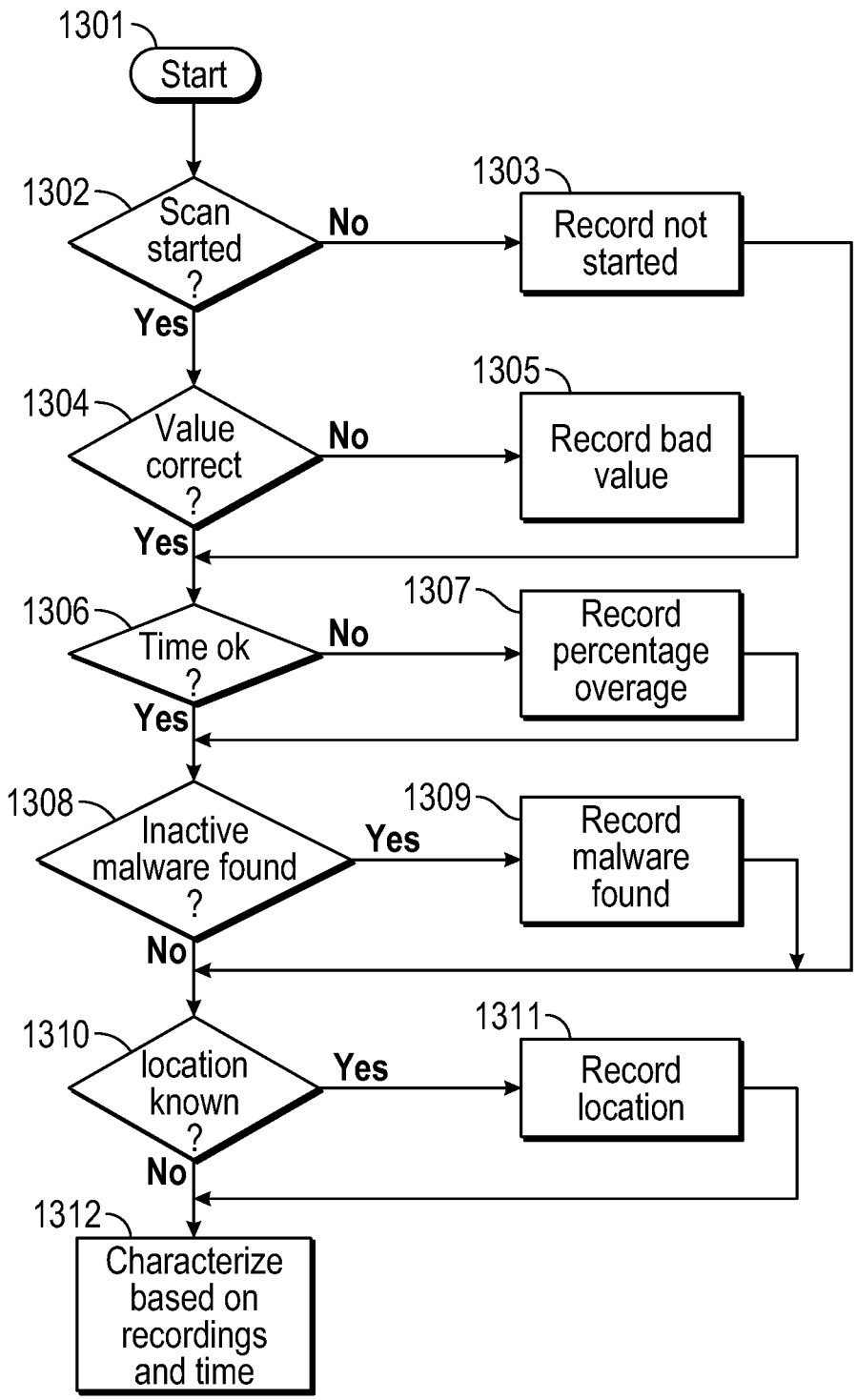
FIG. 13 illustrates an example collection of observations from an attempted scan, and an associated characterization of the security posture of the associated device.

A simplified example is shown in FIG. 13.

Therefore, observing the environmental data may help disambiguate between two or more known strains of malware that both have some characteristics described by the associated tuple (completion, timing success, value success, checksum, time, success). Namely, a given device may result in (completion, timing success, value success, checksum, time, success)=(false, *, *, *, *, false), which means that the malware that infects it does not allow the computation to complete. Another collection of devices in the same neighborhood may exhibit the very same (completion, timing success, value success, checksum, time, success)=(false, *, *, *, *, false). That is an indication that they all correspond to the same type of infection, and that this infection may spread using Bluetooth or Wifi. On the other hand, if there is significant co-location among devices that are observed to be infected and that are represented by a given tuple, then it is concluded that these devices are not likely to be infected with malware that spreads using Bluetooth or Wifi.

In one implementation, it is determined whether a piece of malware will agree to let an infected device make a connection to the external verifier; whether it will allow its code to be read using a checksumming phase; whether it pages out when told to do so; whether it causes a delay when the scan is performed.

The above detection and classification does not require knowledge of the type of malware but a given pattern, where the pattern corresponds to a tuple and a collection of environmental data. It is possible to identify new strains of malware, and to distinguish them from other strains, whether these other strains are known or not.

Once it is established what category of malware a given instance corresponds to, the verifier determines what other devices are at high risk, based on the inferred propagation behavior of the malware strain likely to be associated with the device. Then, the verifier proactively requires associated devices to be screened to determine whether they are infected or not; proactively limits access to resources for such devices; and alerts resource providers of the outbreak and its associated trends and characteristics.

Maintaining Simplicity for State Identification.

Another feature is a technique to simplify the state identification process. A first aspect of this is a method to effectively disable components for which the engineering effort of configuring would otherwise be too great. For example, a typical device may have a collection of identical application processors, and another set of dis-similar processors, such as a power management processor, a graphics processor, a SIM card processor, and a modem (or baseband) processor. Only some of these processors can execute code that is at risk of being malware, or being infected by malware. One only needs to be concerned with using these during the scan operation. However, to avoid having to synchronize such processors with the application processors, which may be running at a different clock speed; have a different number of registers; and have other differences that require a configuration different from what the application processors require. In some embodiments, to simplify the engineering process while making sure that such processors are not used by malware during the scan, a secondary task is used, where this task is not producing results related to the scan performed by the application processors, but where it still produces a result that proves that the processor was not used for any undesirable purpose. An example routine that can be run involves computation of consecutive hash chain values, e.g., hashes of hashes of hashes (etc) of an input value. This is an operation that will keep the associated processor busy, but which avoids congesting the bus; avoids memory accesses; and avoids coordination with the application processors running the regular scan. The result of the operation is provided along with the result of the scan. The input to the secondary computational task is preferably provided by the same entity that provides the input to the scan process; and these two inputs may be the same value. The result of the computation from the secondary computational task is reported along with the result of the scan.

Figure 14:
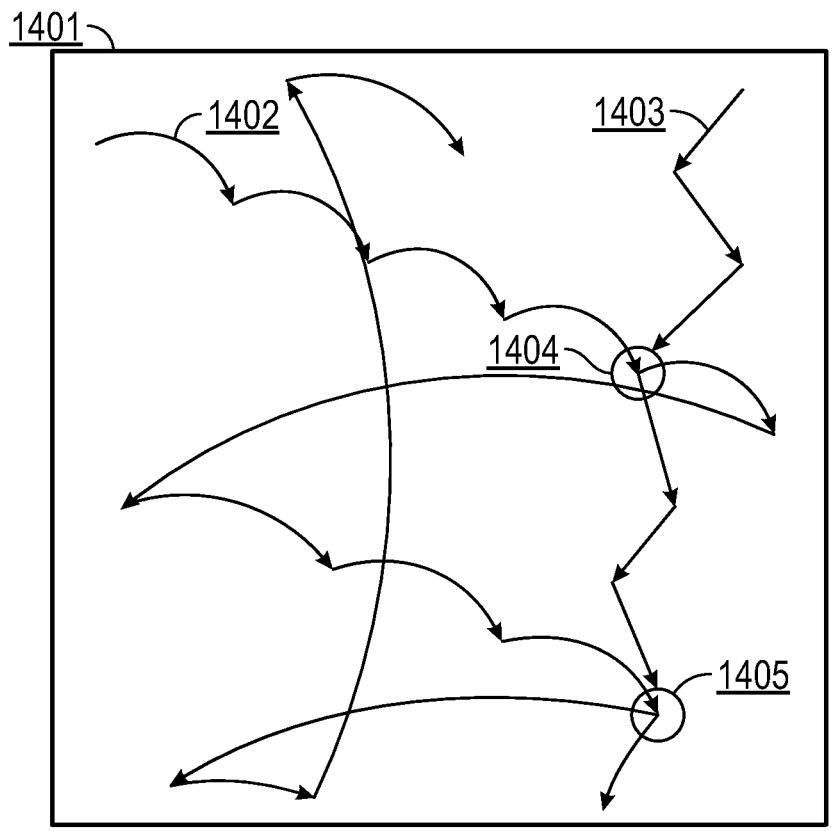
FIG. 14 illustrates the example access of cells in RAM by two processors, using two significantly different access patterns.

In one implementation, the device that is being tested has multiple cores, and at least one core performs a different task than the other cores. For example, one core may perform a calculation that is affected by any attempt to remap memory, but which is not guaranteed to cover all cells of relevance, whereas one or more other cores may perform a calculation that computes a checksum of a collection of all memory cells of relevance. The result from each core may be considered the result of a test. This simplifies the engineering effort, as some cores can be kept busy in a way that makes certain that they were not used by malware during the scan, but without contributing in a significant manner to computing the scan result associated with the timing measure. Further, performing different tasks on different processors complicates the efforts of a malware author who is trying to hide the presence of the associated malware by remapping memory in a way that minimizes the number of cache misses. This is because the different cores will access at least some of the same RAM memory cells, causing difficult interdependencies between the processes run on the different cores due to the significantly different access patterns and the a priori unpredictable dependencies due to the modification of at least some of these cells that are accessed by two or more cores. An example of this is shown in FIG. 14.

Figure 12:
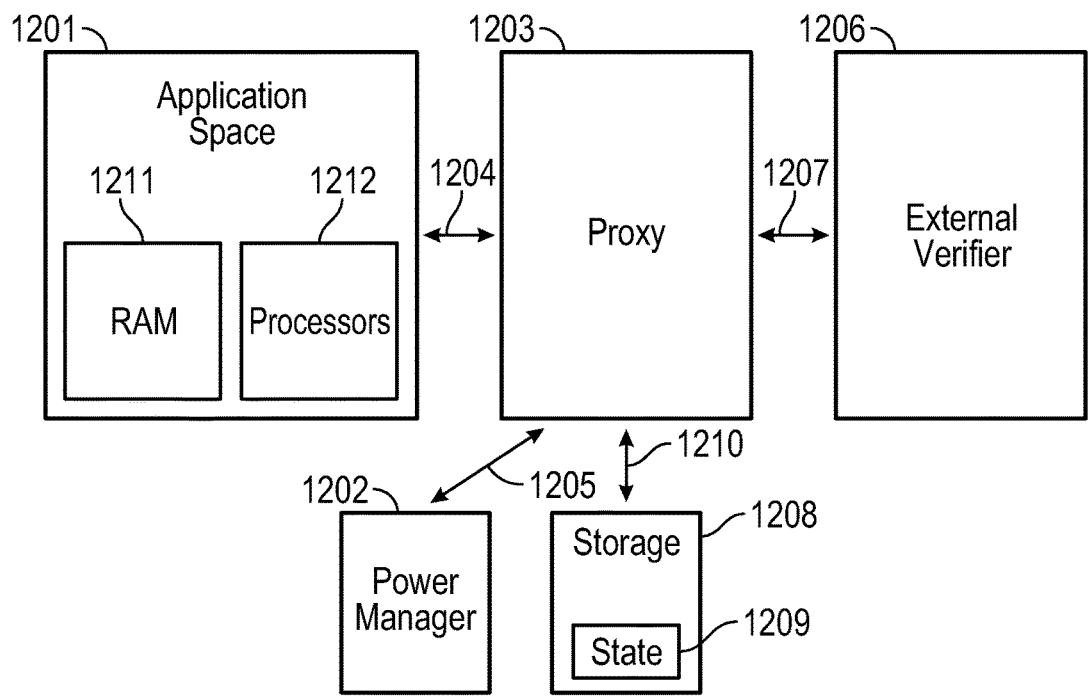
FIG. 12 illustrates an example of an application space associated with a device, and a power manager associated with the same device.

In some embodiments, power management of processors is performed, e.g., to avoid computation in reduced-capability environments, such as using only some of the application processors or running the system at a lower clock speed than is possible. A first approach involves using a custom driver to communicate a request to the power management processor, where this request causes computation in a desirable state, i.e., at full clock speed and using all desired processors. This can be achieved either by requesting a temporary over-ride of current power management policies. It can also be achieved by "duping" the power management processor that the device is in a fully-powered state, even when it is not; this can be done by forging signals that indicate full battery resources. Another technique involves using a safe processor to observe the signals sent to the power management processor, and infer the power management mode. The safe processor, which is a processor that is believed not to be at risk for infection, such as a baseband processor, can then assert to an external verifier that the computational environment during the scan was in a particular state, such as using a particular clock speed or only some application processors. An alternative approach is for the safe processor to observe the signals sent by the power management processor to other components, and reporting this information to an external verifier. The external verifier uses the knowledge of the power management mode to determine the time the scan is expected to take, and compares this to the time it was reported to take. Here, the report of how long the scan took can be made by a safe processor, or by an external processor, such as one in a base station. An example of this is illustrated in FIG. 12.

Figure 15:
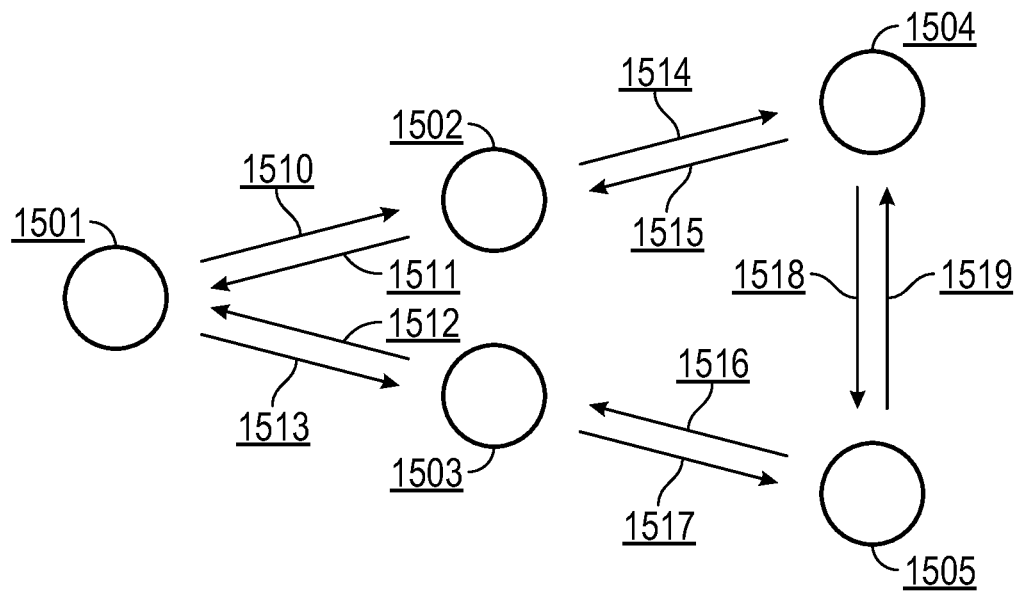
FIG. 15 illustrates an example use of a peer-to-peer network to scan nodes.
Figure 16:
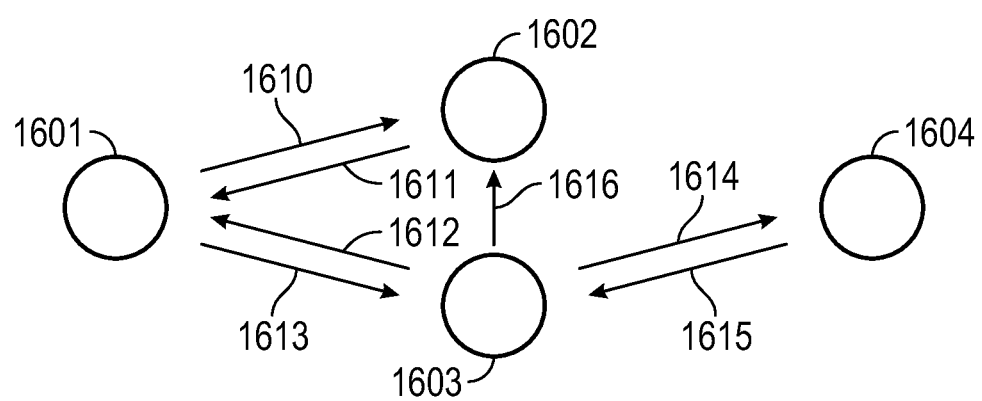
FIG. 16 illustrates an example use of a peer-to-peer network to scan nodes.

In some embodiments, the scan algorithm is adapted for use in peer-to-peer environments, such as sensor networks. There, individual nodes do not have direct communication access to external nodes, but only communicate using peers. These peer nodes may be subject to power limitations that makes it impractical for to act as regular external verifiers, where the regular external verifiers produce challenges, determine the answers to these, and determine the security posture of target devices, and where each verification involves the creation of a new challenge and the associated correct value for verification of the response. In some embodiments, to address this, a first node acts as an external verifier to a second node. If the scan proceeds successfully, it is determined that the second node is secure. The first node can continue using the same challenge with additional target nodes, such as a third node. If any scan fails, then the challenge is considered insecure, and is no longer used. This determination is then propagated across the network. If all verified nodes are considered secure, then the challenge is still considered secure. Nodes that have already been challenged know the challenge as a result of being challenged, and can now use the same challenge to challenge additional nodes. The nodes that have already been challenged also know the response to the challenge, which enables them to verify the responses they get from nodes they challenge. When a node passes a challenge, it receives a token from the challenger. The token is a signal that the receiving node has passed the challenge. If a node is challenged more than once using one specific challenge, then it responds with the token to prove that it has already passed the challenge. This protects the system from "circular" verifications, in the absence of a pre-determined path of challenges through the network. In one implementation, one portion of the token is a value that is modified using a one-way function each time a node receives the token after having passed a challenge. That part of the token is not used to signal having already passed the challenge, but is used to audit the order in which nodes pass challenges, which is helpful to determine what nodes were successfully challenged before a corrupted node was identified, as identified by a failed scan. When a failed scan is detected, then this information is propagated through the system, which stops further scans using the same challenge to be performed. In addition, the part of the token that is modified for each time it is received by node that passes a challenge is modified using this one-way function used, and is then transmitted over the network as a signal indicating what portion of the network was already scanned. Any node that has a pre-image of that token part passed a challenge before the failed scan took place, and can prove this to a node by providing this pre-image, after having verified that the node it provides the pre-image to is secure. FIGS. 15 and 16 show examples of this feature.

Discussion of Figures

FIG. 1 illustrates an embodiment of how different behaviors with respect to one test can distinguish malware instances. There is a collection 100 of possible or known behaviors, including four different behaviors, 110, 120, 130 and 140. Malware instances 111 and 112 have behavior 110, and malware instances 112 and 121 have behavior 120. Malware instances 131 and 132 have behavior 130. There may be further instances, some of which may not be known. A malware instance observed to have behavior 110 could be 111, 112 or an unknown instance, but cannot be 121, 131 or 132. Observing that this malware instance also has behavior 120 precludes that it is malware instance 111 alone. If malware 111 and 121 can co-exist, this is a possibility still. It is either malware instance 112, both 111 and 121, or a new malware instance that is not yet known. Observing that a malware instance has behavior 130 means that it is malware instance 131, 132 or an unknown malware instance, but that it cannot be malware 111, 112, or 121.

Here, behavior 110 may correspond to the malware agreeing to be paged out by a detection routine. Behavior 120 may correspond to the malware only affecting Android phones with one specific version of the operating system. Behavior 130 may correspond to the malware attempting to block connections to the service that performs scans of devices. Behavior 140 may correspond to a test vector (completion, timing success, value success, checksum, time, success)= (false, *, *, *, *, false), which is a combination of behaviors.

Figure 2:
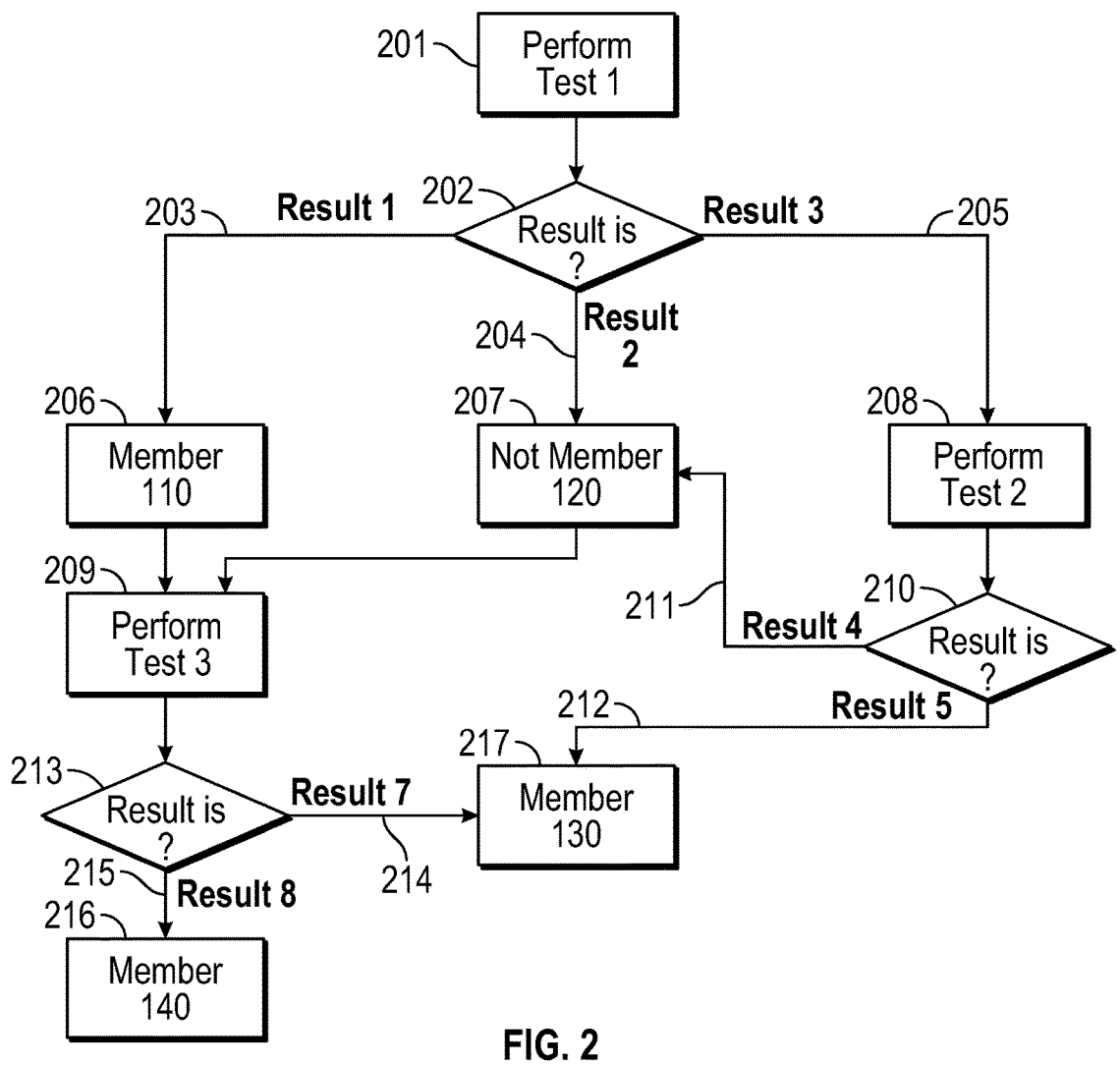
FIG. 2 illustrates an example of a decision graph that can be used to determine what malware is present on an observed device.

FIG. 2 illustrates an example of a decision graph that can be used to determine what malware is present on an observed device. Test 1 is performed 201, after which the result is observed 202. If it is a first result 203 then 206 the malware is a member of behavior class 110. If it is a second result 204 then 207 the malware is not a member of behavior class 120. If it is a third result 205 then 208 a second test is performed, and the result of the second test observed 210. If this result is a fourth result 211 then 207 the malware is not a member of behavior class 120, whereas if it is a fifth result 212 then 217 the malware is a member of behavior class 130. In cases 206 or 207 a third test is performed 209, and the results are inspected 213. If it is a seventh result 214 then 217 the malware is a member of behavior class 217, and if it is an eighth result 215 then 216 the malware is a member of behavioral class 140. The first test may correspond to the believed operating system version of the observed device, where the first result 213 is iOS; the second result 204 is Android; and the third result 205 is Windows. The second test 208 determines if the device refuses to respond when scanned. The third test 209 determines whether the result of the scan is correct but the time too long (the seventh result, 214) or the result of the scan is incorrect (the eighth result, 215).

An alternative approach to a collection of sequential test evaluations is to use unsupervised learning and clustering to identify likely malware instances based on known behavioral results. This conceptually leads to essentially the same result, but may be more efficient for a large number of tests.

Figure 3:
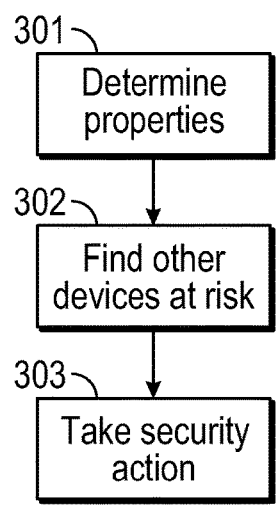
FIG. 3 illustrates an example of a process that involves determining properties of an identified malware instance, the identification of other devices that are likely to be at risk by having the same properties, and taking a security action.

FIG. 3 illustrates an example of a process that involves determining the properties 301 of an identified malware instance; the identification 302 of other devices that are likely to be at risk by having the same properties; and a security action 303 taken. Here, security action 303 may be specific to each device identified in 302, and depend on the degree to which each such device matches the properties determined in 301. The action may also be the same for many devices with the same or different properties identified in 302. Example actions 303 are network isolation until the devices have been verified to be secure; malware scan of identified devices; and limited transaction capabilities until a security task has been completed for the identified devices.

FIG. 4 illustrates two example records 400 and 410 that are associated with desirable states. Record 400 corresponds to a banking application, and process 410 to a VPN application. A banking application associated with record 400 initiates a scan, and passes an identifier describing record 400 as part of the initiation. After the scan has been completed, record 400 is loaded. Element 401 identifies what software to load to run the remaining process, and element 402 contains a cryptographic value describing what said remaining process is expected to look like, where example cryptographic values are message digests of associated code and data or digitally signed descriptions of such code and data, and is used to prevent introduction of bad code. Element 403 contains a collection of pointers to processes that are required, where 406 is such a pointer. Element 404 a collection of pointers to processes that are allowed, where pointers 407 and 408 are such pointers. Thus, elements 403 and 404 are example rules associated with record 400. Element 405 is a cryptographic value similar to 402, describing the elements of 400, not counting 405, and is used to prevent introduction of bad record elements. A VPN application associated with record 410 initiates a scan, and passes an identifier describing record 410 as part of the initiation. After the scan has been completed, record 410 is loaded. Element 411 identifies what software to load to run the remaining process, and element 412 contains a cryptographic value describing what said remaining process is expected to look like, where example cryptographic values are message digests of associated code and data or digitally signed descriptions of such code and data, and is used to prevent introduction of bad code. Element 413 contains a collection of pointers to processes that are required, where 416 is such a pointer. Element 414 is a collection of pointers to processes that are allowed or acceptable, where pointers 417 is such a pointer. Element 415 is a cryptographic value similar to 412, describing the elements of 410, not counting 415, and is used to prevent introduction of bad record elements. Record 420 corresponds with communication software that is needed by the banking application associated with record 400. As element 403 is processed, record 420 is loaded and processed. Element 421 identifies what software to load to run the remaining process, and element 422 contains a cryptographic value describing what said remaining process is expected to look like, where example cryptographic values are message digests of associated code and data or digitally signed descriptions of such code and data, and is used to prevent introduction of bad code. Element 423 contains a collection of pointers to processes that are required, where 426 is such a pointer. Element 424 a collection of pointers to processes that are allowed, where pointers 427 is such a pointer. Element 425 is a cryptographic value similar to 422, describing the elements of 420, not counting 425, and is used to prevent introduction of bad record elements. Record 430 corresponds to a routine that encrypts data, and is required by the software associated with records 400 and 420. Record 440 is a routine that allows the user to place and receive phone calls. This routine is allowed by the banking application associated with record 400, and is required by the VPN routine associated with record 410, since this routine sometimes requires call-backs to verify the identity of the user. Record 450 corresponds to a game that is believed not to be dangerous. It is allowed by 420, but not by 400, so if the banking app corresponding to record 400 is loaded, it will not be allowed, in spite of the fact that communication routine 420 allows it. However, in another context where communication routine corresponding to record 420 is running but the banking application corresponding to record 400 is not, the game corresponding to record 450 is allowed. Record 460 corresponds to an allowed state of the VPN application associated with record 410. Record 460 corresponds to information about a user, including user name and a phone number associated with the user. It is not necessary, and if it is not loaded, then the user has to fill in these fields on his own, and perform a collection of associated selections in the user interface. However, if it is loaded, this streamlines the user experience by loading a desirable state in the VPN process corresponding to record 410. By using the state associated with record 460, the process associated with record 410 is therefore put in an associated state, which is desirable. Record 470 is a data collection that is used by some routine as an input. It contains encrypted passwords used by a password manager. The key that is used to decrypt the encrypted passwords is kept by an external verifier who transmits the key only after the scan has completed in a successful manner.

FIG. 5 illustrates an example of how processes are loaded. The task is started 500. An input provided by a calling routine provides a collection of required records that are identified 501. The required records are loaded and validated 502. If any is not successfully validated, it is not loaded, and the failure is reported. It is determined 503 whether all required records have been loaded, including those that are required by already loaded required records. If not, then the identification 501 is continued. If all required routines are loaded and successfully validated, the allowed records are identified 504. Based on determination 505 of what allowed records that were identified were allowed by all the required processes that have been loaded, such records are selected. These selected records are validated and loaded 506, assuming they are valid. If they are not valid, they are not loaded. After all selected allowed records have been processed, it is determined 507 whether the loading of required and allowed records has completed. If it has not, then required records are identified 501; otherwise, the task completes 508.

Figure 6:
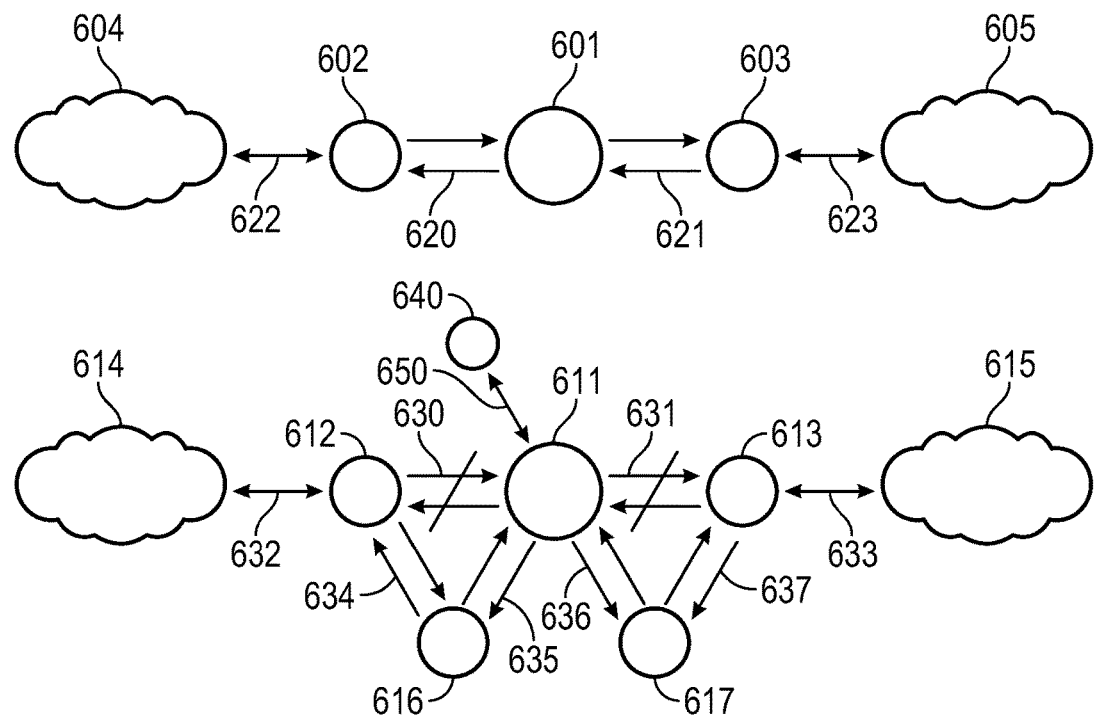
FIG. 6 illustrates an example router that is connecting a first network to a second network.

FIG. 6 illustrates an example router 601 that is connecting a first network 604 to a second network 605 by transmitting (620 and 621) packets from and to network nodes 602 and 603, who send and receive traffic (622 and 623) from the first and second networks. The router 601 at a later time is denoted 611, and nodes 602 and 603 are denoted 612 and 613, and networks 604 and 605 are denoted 614 and 615. An external verifier 640 wishes to scan 650 the router 611, but during the scan, router 611 cannot process any packets. Therefore, temporary nodes 616 and 617 are buffering traffic from the first network 614 and the second network 615 sent to nodes 612 and 613, but then blocked (630 and 631) from being sent to router 611, and instead temporarily stored in nodes 616 and 617. After the scan 650 has completed, the buffered traffic is transmitted (635 and 637) to the router, which processes the traffic and forwards (630 and 631) it to nodes 612 and 613. At the same time, additional traffic is being received from and sent to nodes 612 and 613. In one embodiment, node 616 is the same as node 612, and node 617 the same as 613. In one embodiment, external verifier or an associated proxy is the same as node 616.

FIG. 7 illustrates an example directory 700 that contains records associated with desirable processes, states, data and rules. It contains a record 701 associated with a browser, a record 702 associated with an SMS routine, a record 400 associated with a banking application, a record 410 associated with a VPN routine, and a record 470 associated with an encrypted data structure used by a password manager. This directory may reside on a client device and can be augmented by the user requesting to use another application; by the user configuring a state; or the user providing some data; and after scrutiny of such application or process, state or data.

FIG. 8 illustrates two example directories 700 and 801, where directory 700 contains required processes and directory 801 contains acceptable processes. Here, 802 and 803 are two games, 420 is a communication routine, and 470 is a data collection. Note that 470 is both contained in 700 and 801; this is because it is required in some contexts and acceptable in others.

FIG. 9 illustrates an example of how records are created, such as those records shown in FIG. 4. First, the system identifies trusted elements, where an element can be a process, a state of a process, a rule or a collection of data. Cryptographic validator values are computed 902; examples of these are message digests or digital signatures. These are computed on representations of the identified trusted elements. Records are then created 903, including such cryptographic values, and collections of pointers to required and allowed elements.

FIG. 10 illustrates an example of how a modified SSL client can be used to add scan functionality to a device, but without requiring an awareness among app developers. In an old setting, legacy app 1000 on the client calls 1005 a legacy SSL build routine 1001 running on the client, which initiates 1006 interaction with a legacy SSL routine on the server 1002, causing an SSL session to be built between SSL client 1001 and SSL server 1002. An identical legacy app 1010 to previous legacy app 1000 calls 1015 in the same way as 1005 a modified SSL build routine 1011 running on the client, which initiates 1016 interaction with a modified SSL routine on the server 1012. Server 1012 communicates 1018 with an external verifier 1013 that initiates 1017 a scan on client device associated with legacy app 1010. In one version, this is done by external verifier 1013 initiating communication with modified SSL routine 1011, initiating a scan, receiving 1017 the results of the scan from the client device associated with legacy app 1010, making a security posture determination, and communicating this security posture determination to modified SSL routine 1012, which makes a security decision and optionally causes an SSL session to be built between SSL client 1011 and SSL server 1012. In an alternative version, the SSL connection is established between SSL client 1011 and SSL server 1012 before the scan is initiated by external verifier 1013, and is optionally torn down after external verifier 1013 communicates the security posture determination to SSL server 1012. In one version, the communication 1017 is relayed via SSL server 1012. Furthermore, an identical legacy app 1020 to legacy app 1000 and legacy app 1010 calls 1025 in the same way as 1015 a modified SSL build routine 1021, identical to modified SSL routine 1011, running on the client, which initiates 1026 interaction with a legacy SSL routine on the server 1022, causing an SSL session to be built between SSL client 1001 and SSL server 1002. Therefore, the use of the modified SSL routine 1011 and 1021 enables a scan of the associated device when interacting with a modified SSL client 1012. If either the SSL client 1001 or the SSL server 1002 (and 1022) is a legacy server, then this scan is not performed. The legacy app 1000 (and 1010 and 1020) does not need to be modified to cause said scan to be performed.

FIG. 11 illustrates an example device 1101 with an associated device ID 1102, which may be use an HTML cookie or other device-specific identifier. Device 1101 is associated with a context 1005, such as the IP address is connects from; the type of transaction device 1101 requests; or the history of requests from device 1101. When device 1101 communicates 1104 with server 1103, server 1103 determines at least part of device ID 1102 associated with device 1101 and at least part of context 1005 associated with device 1101. It accesses 1107 a database 1106 and retrieves a record associated with device 1101; determines whether, based on the at least partial context and at least partial device ID whether to require a scan. If it is determined that a scan is required then server 1103 sends a request 1108 to external verifier 1109 to initiate a scan of device 1101.

FIG. 12 illustrates an example of application space 1201 associated with a device, and a power manager 1202 associated with the same device. The application space 1201 is associated with RAM 1211 and processors 1212. Proxy 1203, which is associated with the same device communicates with the application space 1201 and with the power manager 1202. In one implementation, proxy 1203 causes power manager 1202 to enter a desired state, such as a state in which full power is used for the duration of a scan session, and where all processor 1212 resources are used in the scan session. In an alternative implementation, proxy 1203 infers the state of power manager 1202 and stores 1210 this in a state 1209 in a storage 1209. The proxy 1203 interacts 1207 with external verifier 1206 and receives a challenge value that is temporarily stored in state 1209. Proxy 1203 communicates 1204 being ready to initiate a scan and receives back 1204 a request to start the scan. Proxy 1203 then accesses at least part of the challenge stored in state 1209 and communicates 1204 this to application space 1201, where processors 1212 perform a computation and responds 1204 to proxy 1203 with a result that is stored 1210 as part of the state 1209 associated with the scan, along with a timing measure indicating the duration of the scan from the time the challenge was sent to application space 1201. The associated timer is also stored as part of state 1209 in storage 1208. Proxy 1203 communicates 1207 at least part of the state 1209 to external verifier 1206, including the result of the communication associated with the challenge; the time measurements associated with the computation associated with the challenge; and in some implementations an assertion associated with the state of the power manager 1202. The external verifier 1206 receives this communicated information and makes a security determination based on the received information.

FIG. 13 illustrates an example collection of observations from an attempted scan, and an associated characterization of the security posture of the associated device. The characterization starts 1301. It is determined whether the scan was successfully started; if not, then this is recorded 1303. Otherwise, the system determines if the value response to the challenge is correct 1304. If not, then the bad value is recorded 1305, along with an indication that this is a bad value. It is determined whether the execution time is within an acceptable bound 1306. If not, then the overage percentage is recorded 1307. It is further determined whether inactive malware was found after the scan completed 1308. If yes, then a description of this inactive malware is recorded 1309. It is determined whether the location of the device is observed 1310, e.g., from the location of the baseband station it communicates with. If yes, then this location is recorded 1311. Based on the recorded data, the security posture is characterized 1312.

FIG. 14 illustrates the example access of cells in RAM 1401 by two processors, using two significantly different access patterns. A first processor performs a first sequence of accesses 1402 of RAM 1401, and a second processor performs a second sequence of accesses 1403 of RAM 1401, where cell 1404 and cell 1405 are accessed by both, and where cell 1404 is accessed as part of the first sequence 1402 after it is accessed as part of the second sequence 1403, but cell 1405 is accessed as part of the first sequence 1402 before it is accessed as part of the second sequence 1403. In this example, the first sequence 1402 involves only reading the cells of the sequence, whereas the second sequence 1403 involves first reading a cell of the sequence; then performing a computation; and then writing the same cell; and then moving to the next cell of the sequence. Hence, by cell 1404 being accessed as part of the second sequence 1403 before it is accessed as part of the first sequence 1402 modifies the contents of the cell before it is being accessed as part of the first sequence 1402, relative to the contents associated with the cell before the access sequences are started. In comparison, cell 1405 is not modified as part of being accessed in the second sequence 1403 before it is being accessed in the first sequence 1402.

FIG. 15 illustrates an example use of a peer-to-peer network to scan nodes. All communication connections are encrypted using a pairwise encryption technology, where only the intended recipient of an encrypted message can decrypt the encrypted message. Node 1501 challenges 1510 node 1502 and receives a response 1511 indicative of node 1502 being secure. Node 1501 concludes that node 1502 is secure. Node 1501 then transmits 1510 a token to node 1502. Node 1501 challenges 1512 node 1502 and receives a response 1513 indicative of node 1503 being secure. Node 1501 concludes that node 1503 is secure. Node 1501 then transmits 1512 a token to node 1503. Node 1502 challenges 1514 node 1504 using the same challenge 1510 that it previously received from node 1501. Node 1502 receives a response 1515 indicative of node 1504 being secure. This is verified using the response that node 1502 computed in response to challenge 1510. Node 1502 concludes that node 1504 is secure. Node 1502 then transmits 1514 a token to node 1504. Node 1503 challenges 1516 node 1505 using the same challenge 1512 that it previously received from node 1501, which is also the same challenge that node 1501 sent 1510 to node 1502. Node 1503 receives a response 1517 indicative of node 1505 being secure. Node 1503 concludes that node 1505 is secure. This is verified using the response that node 1503 computed in response to challenge 1512. Node 1503 then transmits 1516 a token to node 1505. Node 1504 challenges 1518 node 1505 using the same challenge 1514 it received from node 1502. Node 1505 determines that this is the same challenge 1516 that it received from node 1503, and responds 1519 with then token it received 1516 from node 1503 after having passed the challenge from node 1503. Node 1504 concludes that node 1502 is secure, based on receiving the token. Node 1505 concludes that node 1504 is secure, based on receiving the challenge matching its token.

FIG. 16 illustrates an example use of a peer-to-peer network to scan nodes. Node 1601 challenges 1610 node 1602 and receives a response 1611 indicative of node 1602 being secure. Node 1601 transmits 1610 a token to node 1602. Node 1601 challenges 1612 node 1603 and receives a response 1613 indicative of node 1603 being secure. Node 1601 transmits 1612 a token to node 1603. Node 1603 challenges 1614 node 1604 and receives a response 1615 indicative of node 1604 being insecure. Node 1603 transmits alerts 1616 and 1613 and 1614 to all its neighbors, indicating that node 1604 is insecure. The alert contains an updated token portion. The updated token portion cannot be used to compute the tokens held by nodes 1601, 1602 and 1603, but said three nodes can prove that they have tokens that can be used to compute the updated token, thereby showing that they were scanned and considered secure before node 1604 received 1614 the challenge.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
a processor; and
a memory coupled with the processor, wherein the memory is configured to provide the processor with instructions which when executed cause the processor to:
identify a first list of items acceptable to a first process by at least one of consulting a table of items or examining contents of the first process;
determine a second list of items acceptable to a second process in context to the first process by accessing the first list of items;
ascertain if a secure access to the first process should be used for accessing the first process, the ascertaining whether to use the secure access being determined based on a stored value of an evolved initial state of the first process where the stored value corresponds to a safe state;
perform a first secure action based on a determined integrity of the first process and an intersection of a plurality of acceptable items from the first list and the second list, wherein the first secure action further includes adding at least one item from the second list to the first list; and
perform a second action that is different from the first secure action in the event the first list and the second list do not include the intersection.

2. The device of claim 1, wherein ascertaining a secure access to the first process should be used includes issuing a computing challenge comprising assigning different tasks for respective different processing cores and comparing a computed result and a computed time to a stored value.

3. The device of claim 1, wherein ascertaining a secure access to the first process should be used includes issuing a computing challenge comprising power limitation of the device and comparing a computed result and a computed time thereof to a stored value.

4. The device of claim 1, wherein ascertaining a secure access to the first process should be used includes issuing a computing challenge adapted to comprise a tuple of completion, timing success, value success, checksum, time and overall success results.

5. The device of claim 1, further comprising:
allowing the first process to execute in the event that the first process is ascertained a secure access; and
wherein the second action includes preventing the first process from executing.

6. The device of claim 1, wherein the first list of items acceptable to a first process include a specific device, a specific banking record, a specific record associated with a VPN (Virtual Private Network) application and an HTML (hyper transfer meta language) cookie and other specific device identifiers.

7. The device of claim 1, wherein the first list of items acceptable to a first process include a recent use of the device and a GPS (global positioned satellite) location of the device.

8. The device of claim 1, wherein the first process is adapted to execute code and applications including an operating system and elements thereof, drivers and other programs.

9. The device of claim 1, wherein the first list of items acceptable to the first process includes items in a directory which are activated and made accessible to the device.

10. The device of claim 1, wherein the first secure action includes network isolation, a malware scan of identified devices and a capabilities limiting transaction of identified devices based on completion of a security action and a verification of the identified devices to be secure.

11. The device of claim 1, wherein ascertaining secure access to the first process comprises performing a plurality of memory access security measures executing only a code from ROM (Read Only Memory), RAM (Random Access Memory) that is loaded from a trusted source and performing a write access to the code adapted to be blocked once the loading is complete.

12. A method for managing a device, comprising:
identifying a first list of items acceptable to a first process by at least one of consulting a table of items or examining contents of the first process; and
determining a second list of items acceptable to a second process in context to the first process by accessing the first list of items;
ascertaining if a secure access to the first process should be used for accessing the first process, the ascertaining whether to use the secure access being determined based on a stored value of an evolved initial state of the first process where the stored value corresponds to a safe state;
performing a first secure action based on an intersection of a plurality of acceptable items from the first list and the second list, wherein the first secure action includes determining a secure access to the first process and is based on a determined integrity of the first process; and
performing a second action that is different from the first secure action in the event the first list and the second list do not include the intersection;
wherein the first secure action includes adding at least one item from the second list to the first list.

13. The method of claim 12, further comprising:
allowing the first process to execute in the event that the first process is ascertained a secure access; and
wherein the second action includes preventing the first process from executing.

14. The method of claim 12, wherein ascertaining a secure access to the first process should be used includes issuing a computing challenge comprising assigning different tasks for respective different processing cores and comparing a computed result and a computed time to a stored value.

15. The method of claim 12, wherein ascertaining a secure access to the first process should be used includes issuing a computing challenge comprising power limitation of the device and comparing a computed result and a computed time thereof to a stored value.

16. A device, comprising:
means for identifying a first list of items acceptable to a first process by at least one of consulting a table of items or examining contents of the first process;
means for determining a second list of items acceptable to a second process in context to the first process by accessing the first list of items;
means for ascertaining if a secure access to the first process should be used for accessing the first process, where the ascertaining of whether to use the secure access is determined based on a stored value of an evolved initial state of the first process where the stored value corresponds to a safe state;
means for performing a first secure action based on an intersection of at least one acceptable item from the first list and the second list wherein the first secure action includes a means for determining a secure access to the first process based on a determined integrity of the first process; and
means for performing a second action that is different from the first secure action based on a non-intersecting plurality of acceptable items from the first list and the second list;
wherein the first secure action includes adding at least one item from the second list to the first list.

17. The device of claim 16, further comprising:
means for allowing the first process to execute in the event that the first process is ascertained a secure access; and
wherein the second action includes means for preventing the first process from executing.

18. The device of claim 16, wherein means for ascertaining a secure access to the first process should be used includes means for issuing a computing challenge comprising assigning different tasks for respective different processing cores and comparing a computed result and a computed time to a stored value.

19. The device of claim 16, wherein means for ascertaining a secure access to the first process should be used includes means for issuing a computing challenge comprising power limitation of the device and comparing a computed result and a computed time thereof to a stored value.

20. The device of claim 16, wherein means for ascertaining a secure access to the first process should be used includes means for performing a plurality of memory access security measures executing only a code from ROM (Read Only Memory), RAM (Random Access Memory) that is loaded from a trusted source and performing a write access to the code adapted to be blocked once the loading is complete.

* * * * *